E. C. FRENCH.
FLUE SCRAPER.
APPLICATION FILED JAN. 6, 1915.

1,180,485.

Patented Apr. 25, 1916.

WITNESSES:
R. F. Ballard
L. Lewis

INVENTOR
E. C. FRENCH.
BY
ATTORNEY

UNITED STATES PATENT OFFICE.

ELMER C. FRENCH, OF DALLAS, TEXAS.

FLUE-SCRAPER.

1,180,485.　　　　Specification of Letters Patent.　　Patented Apr. 25, 1916.

Application filed January 6, 1915. Serial No. 743.

*To all whom it may concern:*

Be it known that I, ELMER C. FRENCH, citizen of the United States, residing at Dallas, in the county of Dallas and State of Texas, have invented certain new and useful Improvements in Flue-Scrapers, of which the following is a specification.

This invention relates to new and useful improvements in boiler flue scrapers.

The object of the invention is to provide a scraper comprising a plurality of spring scraper arms arranged to be retracted and extended laterally by a novel means.

Another feature resides in the provision of self sharpening cutting blades on the outer ends of the arms arranged in overlapping and overhanging order whereby a continuous circular cutting edge is presented contiguous to the inner surface of the flue.

A still further object of the invention is to provide a device of the character described that will be strong, durable, efficient, and simple and comparatively inexpensive to make, also one in which the several parts will not be likely to get out of working order.

Figure 1:
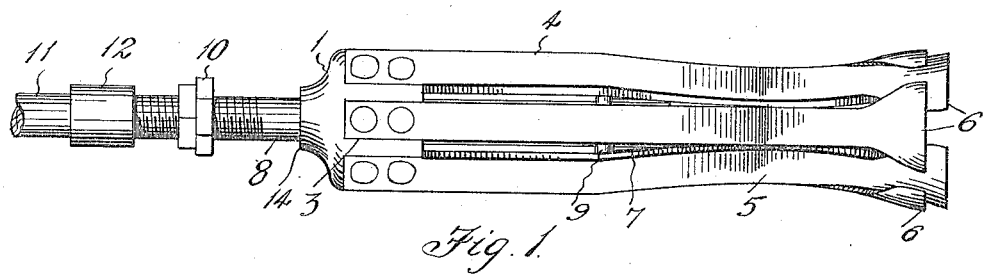
Figure 2:
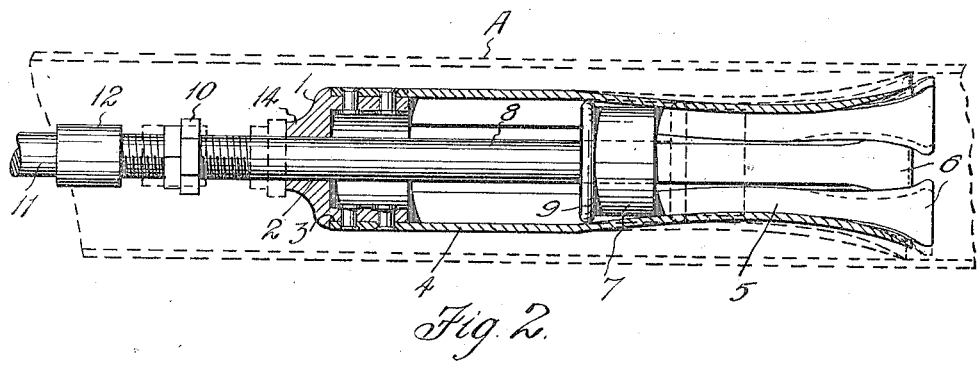
Figure 3:
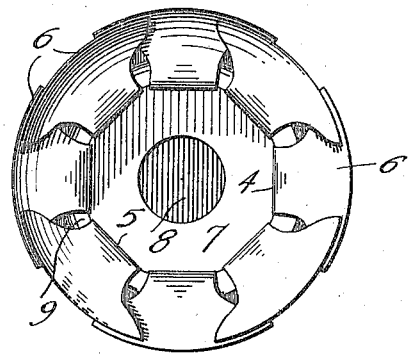

With the above and other objects in view the invention has relation to certain novel features of construction and operation, an example of which is described in the following specification and illustrated in the accompanying drawings, wherein:

Figure 1 is an elevation view of the scraper, Fig. 2 is a longitudinal sectional view of the same, and Fig. 3 is an end view of the scraper.

In the drawings the numeral 1 designates a head casting which has a central aperture 2 and a plurality of external sockets 3 disposed in regular spaced order circumferentially of the casting. A plurality of spring arms 4 have their inner ends seated and riveted in the sockets. These arms are spaced sufficiently to permit a portion to be contracted, which portion is produced by curving each arm inward as indicated at 5.

Beyond the curved contracted portion the arms are flared outward and terminate in scraper blades 6 having knife edges. Each alternate blade projects beyond its two adjacent blades which latter overlap the projecting blade on each side. These blades are curved and are somewhat wider than the arms proper, the metal being gradually reduced in thickness toward the outer ends to produce the knife edge. The blades being flared or curved outward it is apparent that as the blades wear, the knife edges will be maintained thus making the blades self sharpening. The curved overlapping blades present a continuous circular cutting edge when extended against the inner surface of the boiler flue.

Normally the diameter at the forward or scraping end of the device is such as to permit the device to be freely inserted in the boiler flue or tube. In order to expand or distort the arms laterally into contact with the inner surface of the flue, a plunger head 7 is disposed within the arms and has a diameter sufficient to expand the arms when forced into the contracted portion 5. The plunger head is mounted on the end of a plunger rod 8 which slides through the aperture 2 of the casting 1.

The plunger head 7 has an annular boss 9 at its inner end which contacts with the inner sides of the arms, said head thus has a tapered effect as its boss and forward edge will contact with the arms as the plunger is forced into the contracted or neck portion of the scraper. It is obvious that the farther the plunger is driven into the contracted portion the greater the expansion of the arms will be until the boss reaches the center of the said portion.

That portion of the rod 8 extending from the head casting 1 rearward has a part of its length screw threaded to receive a pair of nuts 10 one of which jams against the other whereby the nuts are locked in their adjusted position. These nuts limit the inward or forward thrust of the plunger and abut a boss 14 formed on the casting 1. By adjusting these nuts longitudinally of the rod the length of the thrust of the rod may be varied and the distance into the neck portion 5 at which the plunger head is driven thus controlled; whereby the expansion of the blades is also controlled. A coupling sleeve 12 is screwed on the rear end of the rod 8 and may receive any suitable form of handle rod 11 by which the scraper may be manipulated.

In using the scraper the same is inserted in the boiler which is indicated at A in Fig. 2, the blades being normal or contracted as shown in the full lines in said figure. The plunger rod 8 is now thrust inward or forward and the plunger head carried into the contracted portion 5 of the arms whereby the latter are expanded or distorted laterally so that the blades 6 are brought into contact with the inner surface of the flue as indicated in dotted lines. With the parts in this position the scraper is forced forward whereby the incrustation or scale is removed from the inner surface of the flue by the knife edges of the blades. This cutting action does not injure the flue-tube as the scale is cut off and not broken or knocked off.

It will be seen that by projecting some of the blades beyond the others all may have their cutting edges brought into contact with the flue surface and a continuous circular knife edge action had. By limiting the thrust of the plunger by means of the nuts 10 the plunger head 7 cannot be wedged in the arms or the arms expanded too much; also the nuts striking the boss 14 of the head casting imparts a hammer blow to the scraper whereby it is driven into the work. The arms being of spring metal will retract when the plunger is withdrawn.

What I claim, is:

A flue scraper comprising in combination two sets of outwardly expandible segmental blades having cutting edges at their outer ends arranged cylindrically, one of said sets being ahead of the other and arranged in staggered relation thereto, the outer set surrounding and overlapping the inner and extending diametrically beyond the inner set at their cutting edges.

In testimony whereof I affix my signature in presence of two witnesses.

ELMER C. FRENCH.

Witnesses:
S. C. LEWIS,
JACK A. SCHLEY.

Copies of this patent may be obtained for five cents each, by addressing the "Commissioner of Patents, Washington, D. C."